United States Patent [19]

Melcher

[11] 3,798,434

[45] Mar. 19, 1974

[54] ELECTRONIC DEVICE FOR QUINTUPLING A BINARY-CODED DECIMAL NUMBER

[76] Inventor: Domenic Melcher, Bonstettenstr 26, Uster, Switzerland

[22] Filed: Aug. 22, 1972

[21] Appl. No.: 282,773

[30] Foreign Application Priority Data

June 12, 1972 Switzerland ........................ 8738/72

[52] U.S. Cl. ............................................. 235/159
[51] Int. Cl. ............................................. G06f 7/52
[58] Field of Search .................................... 235/159

[56] References Cited

UNITED STATES PATENTS 3,251,983 5/1966 Constant et al .................... 235/159
3,456,098 7/1969 Gomez et al .................... 235/159 X
3,495,075 2/1970 Leal et al ........................ 235/156 X

*Primary Examiner*—Felix D. Gruber
*Assistant Examiner*—David H. Malzahn
*Attorney, Agent, or Firm*—Stevens, Davis, Miller & Mosher

[57] ABSTRACT

An electronic device for quintupling a binary-coded decimal number in which the several orders of binary digits as well as the powers of ten are transmitted through a single channel and represented serially under the control of a clock pulse.

1 Claim, 2 Drawing Figures

PATENTED MAR 19 1974 3,798,434

ELECTRONIC DEVICE FOR QUINTUPLING A BINARY-CODED DECIMAL NUMBER

Figure 1:
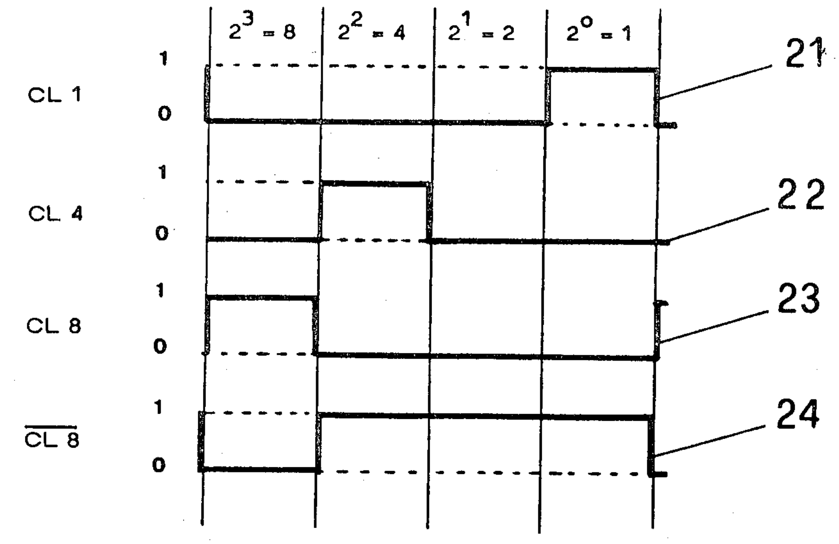

The present invention relates to an electronic device for quintupling a binary-coded decimal number in which the several orders of binary digits as well as the powers of ten are transmitted through a single channel and represented serially under the control of a clock pulse.

The serial transmission of data through one channel as well as the multiplication of binary-coded numbers are already known in the art. If 10 is the radix of the coded number system, in other words if the coded numbers are in the decimal system, then this is known as BCD coding. However, frequently numbers in the octal or hexadecimal system (radix 8 and radix 16 systems) are also coded in binary digits. If such a number is to be multiplied with a fixed factor dictated by the purpose of the arrangement, then the following possibilities are available in the present state of the art:- If the fixed factor is 2 then the multiplication can be reduced to the addition of the number to itself and suitable circuits are known for accomplishing this. If the factor is equal to the radix of the binary-coded numerical system, then the multiplication is carried out by delaying the pulse trains by as many cycles as the radix of the binary-coded number system has binary digits. However, if the factor is neither the number 2 nor the radix of the system of numbers, then the multiplication is not performed by any particular method but, as is usually conventional, by repeated addition. The factor must then be reintroduced for each multiplication or read out of a memory device.

When a binary-coded decimal number is to be quintupled, then this is tantamount to a multiplication of the number with half the radix of the number system. Whereas in a binary-coded octal or hexadecimal system this can be achieved in a purely serial operation, as herein contemplated, by simply delaying the pulse trains, this is impossible to do in the BCD system. If it is therefore desired to multiply a binary-coded decimal number in an electronic computer with 5, then this number 5 must be reintroduced for each multiplication or it must be stored in the computer in such a way that it can be read out whenever required. This necessitates the provision of a memory and of a complete multiplication network. Since such repeated multiplication, in the present instance with 5, are principally needed in small computing units used as single purpose computers for instance in association with measuring instruments and therefore lacking a data memory, the factor in this method must be present in a fixed memory. The expenditure in electronic components and functional groups is therefore considerable and in principle the same whether the fixed factor is a 5 or any other number in relation to the radix of the decimal system.

It is the object of the present invention to quintuple a binary-coded decimal number in electronic computer with a minimum of electronic means.

The proposed device is characterized in that it comprises an adder for adding two binary-coded numbers, three electronic delaying circuits for delaying the voltage pulses by one bit time, as controlled by the clock pulse generator, and two AND gates, one input signal of one AND gate being the original signal that is to be multiplied by 5 and the other input signal being a control signal which is so derived from the clock pulse generator that it is in the logic state ONE only for the first bit of a group, whereas the first input signal of the other AND gate is identical with the output signal of the second delaying circuit and the other input signal of this second AND gate is a control signal so derived from the clock pulse generator that it is in the logic state ONE only for the third bit of a group, the output signals of these two AND gates being combined by an OR gate and applied to one input of the adder, and that a further AND gate additional to the said two AND gates obtains its input signal from the output of the final delaying circuit, the other being a control signal so derived from the clock pulse generator that it is in the logic state ZERO only for the final bit of a group, the output of this latter AND gate being connected to the other input of the adder.

Figure 2:
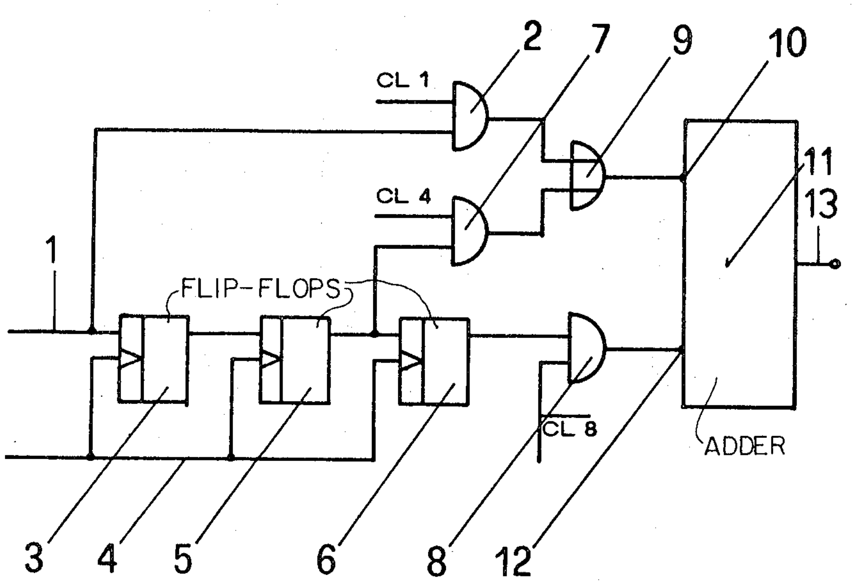

An embodiment of the invention is schematically shown in the accompanying drawing in which FIG. 1 shows a number of control signals in logic representation, and FIG. 2 is a block diagram of a multiplier according to the invention.

Referring to FIG. 1 this graph represents a number of signal forms in logic representation. A signal 21, marked CL 1 in the graph, is in the state ONE for the time of the first lowest order bit or of the digit corresponding to $2^0 = 1$ in a four-bit code group, and ZERO for the three following bits. A signal 22 marked CL4 is ONE for the third bit of the group corresponding to $2^2=4$ and ZERO for the other bits of the group. A signal 23 marked CL8 is ONE for the fourth bit of the group corresponding to $2^3=8$ and ZERO for all the others. A signal 24 marked $\overline{CL8}$ is the negation of signal 23 and is ONE for the first three bits of the group and ZERO for the last. The signals 21,22,23,24 are derived from the clock pulse signal (not shown) and serve purposes of control.

The block diagram of a multiplier is shown in FIG. 2. Coding is in the binary-coded decimal BCD system. The bit orders in consecutive bit times of a group are 1,2,4,8 corresponding to the powers $2^0,2^1,2^2,2^3$. The signal *s* representing the number *z* in serial form is transmitted through a channel 1. This simultaneously feeds an AND gate 2 and a bistable flip-flop 3 operating as a delaying device which delays the signal pulses by the time of one clock pulse from the clock pulse generator (not shown) in channel 4. The signal *s* which has been delayed by the time of one pulse or bit is transferred to a second identical flip-flop 5 which delays it for the time of another pulse. The signal *s*, now delayed by the time of two bit pulses or bits is then transferred to yet another identical flip-flop 6, as well as to a further AND gate 7 which is identical to the AND gate 2. The signal *s*, now delayed by three pulse times, is applied by flip-flop 6 to an AND gate 8 which is identical with the two AND gates 2 and 7. The outputs of the AND gates 2 and 7 are taken to an OR gate 9 which in turn feeds the addend input 10 of an adder 11, whereas the output of the AND gate 8 feeds the augmend input 12 of the adder 11. The adder 11 is designed to effect the addition of two terms.

The manner in which the multiplier according to FIG. 2 functions will be explained by describing the flow of information in the cas e of a single group comprising four bits. If the number *z* represented by the signal *s* is odd, then voltages corresponding to logic ONE will appear in the two inputs of the AND gate 2, namely the first pulse of signal $s$ and the signal 21 identified by CL 1. Consequently a ONE is formed in the output of the AND gate 2 and this is transferred through the OR gate 9 to the input 10 of the adder 11. Two bit times later the same first pulse of signal $s$ appears in the output of flip-flop 5 and hence also in one input of the AND gate 7 of which the other input simultaneously receives the signal 22 identified as CL 4. Consequently this AND gate 7 forms a one which is likewise applied via the OR gate 9 to the input 10 of the adder 11. This latter ONE appears in the bit time corresponding to the order $2^2=4$. The signal pulses delivered by the AND gates 2, 7 therefore appear consecutively in time in such a way that together they form the value $2^0 + 2^2=5$. The first voltage pulses which may follow in the three next bit times — the first determining only the parity of the signal $s$ — represent either individually or in their totality an even integer. Blocked by the signals 21 and 22 they cannot produce a logic ONE in the AND gates 2, 7, but they are delayed by the flip-flops 3, 5, 6 by three bit times, a delay by four bit times in the BCD system means a multiplication with 10 — the radix whereas an advance by one bit time means a division by 2. In other words, a delay by three bit times causes a multiplication by 5. Since the information content of the first bit has already been taken into account this is suppressed by the AND gate 8 by virtue of the signal 24 marked $\overline{\text{CL 8}}$. In the adder 11 the two pulse trains received via the inputs 10, 12 are added. The totals signal, which represents the quintupled signal $s$ can be obtained from the output 13 of the adder 11.

I claim:

1. An electronic device for quintupling a binary-coded decimal number, comprising:

pulse generating means for generating a series of at least four clock pulses and a plurality of time displaced sequential pulses, said time displaced pulses representing the binary weights of a binary-coded decimal number to be multiplied, said plurality of time displaced pulses including first, second and third pulses corresponding respectively to the first clock pulse of said series of four pulses, the third clock pulse of said series and the complement of the fourth clock pulse of said series;

adding means having first and second inputs for adding two binary-coded numbers;

first, second and third serially connected delay circuits, said first delay circuit having an input signal representing a quantity to be multiplied by five applied thereto, said pulse generating means being coupled to said delay circuits to supply clock pulses thereto, the output of each delay circuit being delayed by one clock pulse;

a first AND gate circuit having a first input to which said input signal representing the quantity to be multiplied is applied and a second input to which said first time displaced pulse from said pulse generating means is applied;

a second AND gate circuit having a first input coupled with the output of said second delay circuit and a second input to which said second time displaced pulse is applied;

an OR gate circuit having first and second inputs coupled to the outputs of said first and second AND gates, respectively, the output of said OR gate being coupled to said first input of said adding means; and a third AND gate circuit having a first input coupled to the output of said third delay circuit and a second input to which said third displaced pulse is applied, the output of said third AND gate circuit being coupled to said second input of said adding means.

* * * * *